United States Patent [19]

Mizutani

[11] Patent Number: 5,741,964
[45] Date of Patent: Apr. 21, 1998

[54] APPARATUS AND METHOD FOR DETECTING ABNORMALITY OF AIR FLOW METER

[75] Inventor: Koichi Mizutani, Toyota, Japan

[73] Assignee: Toyota Jidosha Kabushiki Kaisha, Toyota, Japan

[21] Appl. No.: 760,825

[22] Filed: Dec. 5, 1996

[30] Foreign Application Priority Data

Dec. 5, 1995 [JP] Japan ................................ 7-316797

[51] Int. Cl.$^6$ ................................................. G01M 15/00
[52] U.S. Cl. ............................ 73/118.2; 73/118.1; 340/439
[58] Field of Search .................................. 73/116, 117.2, 73/117.3, 118.1, 118.2; 340/438, 439

[56] References Cited

U.S. PATENT DOCUMENTS

| | | | |
|---|---|---|---|
| 4,750,352 | 6/1988 | Kolhoff | 73/117.3 |
| 4,976,139 | 12/1990 | Miyama et al. | 73/117.3 |
| 5,018,383 | 5/1991 | Togai et al. | 73/118.1 |
| 5,127,263 | 7/1992 | Iizuka | 73/118.1 |
| 5,138,873 | 8/1992 | Amano | 73/118.1 |
| 5,249,459 | 10/1993 | Becker | 73/118.1 |
| 5,408,871 | 4/1995 | Lieder et al. | 73/118.2 |
| 5,465,617 | 11/1995 | Dudek et al. | 73/118.2 |
| 5,522,363 | 6/1996 | Gotoh | 73/118.1 |
| 5,542,292 | 8/1996 | Schneider et al. | 73/118.1 |
| 5,597,951 | 1/1997 | Yoshizaki et al. | 73/118.2 |

FOREIGN PATENT DOCUMENTS

| | | |
|---|---|---|
| 55-164312A | 12/1980 | Japan . |
| 6-346778A | 12/1994 | Japan . |

*Primary Examiner*—George M. Dombroske
*Attorney, Agent, or Firm*—Kenyon & Kenyon

[57] ABSTRACT

An apparatus for detecting an abnormality of an air flow meter is disclosed. The flow meter is disposed in an air intake passage of an engine to detect an actual rate of air flowing through the air intake passage. The intake passage has a throttle valve with a variable opening size to control the actual flow rate of the air flowing through the air intake passage. The throttle valve adjusts the actual flow rate of the air according to an engine speed when the opening size is in a first range, and regardless of the engine speed when the opening size is in a second range. A throttle sensor detects the opening size of the throttle valve. An ECU computes a target rate of the air flowing in the air intake passage based on the detected opening size of the throttle valve, and a marginal range for allowing a deviation of the actual rate of the air flow from the target rate. The ECU determines the abnormality of the air flow meter when the opening size of the throttle valve is in the second range and the actual rate of the air is out of the marginal range.

25 Claims, 7 Drawing Sheets

APPARATUS AND METHOD FOR DETECTING ABNORMALITY OF AIR FLOW METER

BACKGROUND OF THE INVENTION

1. Field of the Invention

The present invention relates to an apparatus and method for detecting abnormality of an air flow meter, which is located in an engine's intake passage to detect the air flow therein. More particularly, the present invention pertains to an apparatus and method for detecting abnormalities of a hot wire air flow meter.

2. Description of the Related Art

With regard to controlling an engine, the flow rate of air drawn through an intake passage toward a combustion chamber is an important parameter. The air flow rate is used to compute a target value of the amount of fuel that is to be supplied to the engine. To detect the air flow rate, the intake passage is provided with an air flow meter. There are several types of air flow meters. For example, there are movable vane meters, Karman vortex meters, and hot wire meters.

Among these air flow meters, hot wire air flow meters have become popular due to their high sensitivity. A hot wire air flow meter includes a hot wire that is arranged in the intake passage. The hot wire is heated when electricity flows therethrough. The temperature of the hot wire is altered by the flow rate of the air passing through the intake passage. To maintain the temperature of the hot wire at a constant value, the voltage of the hot wire is altered. The voltage value and its altering rate corresponds to the air flow rate and its altering rate. The engine is controlled in accordance with the air flow rate detected by the air flow meter. Therefore, when the air flow rate is not detected due to abnormalities, such as short circuits or disconnection of the wire, the controlling of the engine becomes inappropriate. If the flow rate of the fuel drawn into the engine is not adjusted appropriately, the concentration of nitrogen oxide (NOx), carbon monoxide (CO), and other components contained in the exhaust gas from the engine may be altered to an undesirable level. Accordingly, it is necessary to detect abnormalities of the hot wire air flow meter for optimum control of the engine.

Japanese Unexamined Patent Publication No. 6-346778 describes an example of a detecting apparatus (first prior art apparatus) that detects abnormalities of a hot wire air flow meter such as short circuits and disconnections. In other words, the detecting apparatus detects abnormalities that disable detection of the air flow rate with the air flow meter. Abnormalities are confirmed by the apparatus when the voltage output of the meter is continuously higher than a reference value over a predetermined time length.

Figure 8:
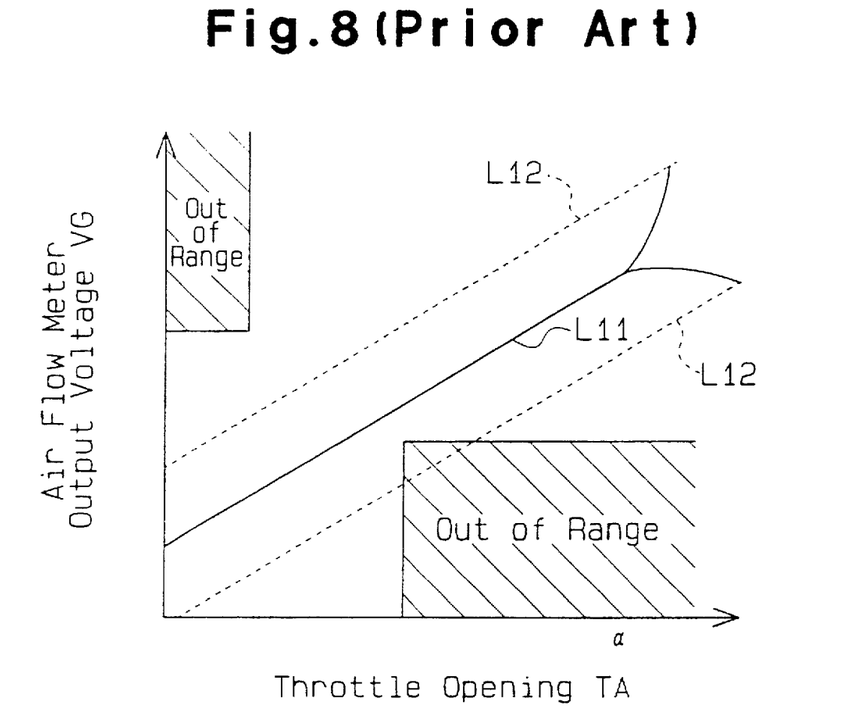
FIG. 8 is a graph showing the range of the air flow meter that may be detected by a prior art abnormality detecting apparatus.

There is another type of a detecting apparatus (second prior art apparatus) that detects not only the abnormalities that cause malfunctioning of the air flow meter but also other abnormalities that obstruct inaccurate reading of the meter. The characteristics of this detecting apparatus are shown in FIG. 8. The graph shows the relationship between the throttle opening TA, which is related with the air flow rate of the engine, and the output voltage VG of the air flow meter. The two areas that are marked by slanted lines indicate ranges in which the air flow meter would not register unless an abnormality of the air flow meter exists. In other words, the slanted lines show ranges that are out of the acceptable registering range of the air flow meter. Parameters including the engine speed, the throttle opening, and the coolant temperature are employed to determine the abnormal registering range. In this graph, line L11 indicates the optimum relationship between the throttle opening TA and the output voltage VG. A range in which the air flow rate detected by the air flow meter would be normal is indicated between the upper and lower bounding lines L12. Accordingly, when the air flow meter output voltage VG is in the range between the upper and lower bounding lines L12, the air flow meter is functioning normally and the value detected by the meter (output voltage VG) is normal. The detecting apparatus detects abnormalities related to the accuracy of the air flow meter when the output voltage VG of the meter is out of the acceptable registering range.

The first prior art apparatus detects abnormalities that disable detection of the air flow rate with the air flow meter. An abnormality of the air flow meter is confirmed when the output voltage of the meter continuously exceeds the reference value for a predetermined time length. Abnormalities that result in inaccurate reading of the air flow meter are not detected by this apparatus.

In the second prior art apparatus, abnormalities that cause malfunctioning of the air flow meter and abnormalities that cause inaccurate reading of the air flow meter are both detected. However, as shown in FIG. 8, output voltage readings that do not fall within the range marked by slanted lines will not be detected as abnormal. Such readings, however, may be outside of the normal range (between the lines L12). The ranges represented by the slanted lines, which are out of the acceptable registering range, are employed to detect abnormalities related to the accuracy of the air flow meter since there are no other methods to detect such abnormalities of the hot wire air flow meters. Furthermore, parameters such as the engine speed, the throttle opening, and the coolant temperature are confirmed to prevent erroneous detection. Accordingly, abnormalities related to the accuracy of the air flow meter may not be detected even when the output voltage VG is outside of the normal range. Furthermore, during a single trip starting from when the engine is started to when the engine is stopped, the conditions, or parameters required to define the unacceptable range may not be satisfied. In such cases, abnormalities are not detected each time the engine is started. This hinders the location of abnormalities at an early stage and delays replacement or repairing of the air flow meter. Consequently, the imbalance of the fuel and air supplied to the engine may cause inappropriate concentration of components such as NOx and CO in the exhaust gas.

SUMMARY OF THE INVENTION

Accordingly, it is an objective of the present invention to provide an apparatus and method for detecting abnormalities of an air flow meter that enable facilitated detection of abnormalities that disable detection of the air flow rate while also detecting abnormalities that cause inaccurate reading of the air flow rate.

To achieve the above objective, an improved apparatus for detecting an abnormality of an air flow meter is provided. The flow meter is arranged in an air intake passage of an engine to detect an actual flow rate of air flowing through the intake passage. The intake passage has a throttle valve with a variable opening size to control the actual flow rate of the air flowing in the intake passage. The throttle valve adjusts the actual flow rate of the air according to an engine speed when the opening size is in a first range. The throttle valve adjusts the actual flow rate regardless of the engine speed when the opening size is in a second range. The apparatus includes detecting means for detecting the opening size of the throttle valve and computing means for computing a target rate of the air flowing in the intake passage based on the detected opening size of the throttle valve. The computing means is arranged to compute a marginal range for allowing a deviation of the actual flow rate of the air with respect to the target rate. The apparatus further includes determining means for determining the abnormality of the air flow meter when the opening size of the throttle valve is in the second range and the actual flow rate of the air is out of the marginal range.

According to another aspect of the present invention, an improved apparatus for detecting an abnormality of an air flow meter is provided. The flow meter is arranged in an air intake passage of an engine to detect an actual flow rate of air flowing through the intake passage. The intake passage has a throttle valve with a variable opening size to control the actual flow rate of the air flowing in the intake passage. The throttle valve adjusts the actual flow rate of the air in proportion to an engine speed when the speed is greater than a predetermined magnitude. The throttle valve adjusts the actual flow rate regardless of the engine speed when the engine speed is smaller than the predetermined magnitude. The apparatus includes detecting means for detecting the engine speed and computing means for computing a target rate of the air flow in the intake passage based on the detected engine speed. The computing means is arranged to compute a marginal range for allowing a deviation of the actual flow rate of the air with respect to the target rate. The apparatus further includes determining means for determining the abnormality of the air flow meter when the engine speed is smaller than the predetermined magnitude and the actual rate of the air is out of the marginal range.

According to a further aspect of the present invention, a method for detecting an abnormality of an air flow meter is provided. The flow meter is arranged in an air intake passage of an engine to detect an actual flow rate of air flowing through the intake passage. The intake passage has a throttle valve with a variable opening size to control the actual flow rate of the air flowing in the intake passage. The throttle valve adjusts the actual flow rate of the air according to an engine speed when the opening size is in a first range. The throttle valve adjusts the actual flow rate regardless of the engine speed when the opening size is in a second range. The method includes the steps of detecting the opening size of the throttle valve, computing a target rate of the air flow in the intake passage based on the detected opening size of the throttle valve, and a marginal range for allowing a deviation of the actual flow rate of the air flow with respect to the target rate, and determining the abnormality of the air flow meter when the opening size of the throttle valve is in the second range and the actual flow rate of the air is out of the marginal range.

According to a further aspect of the present invention, a method for detecting an abnormality of an air flow meter is provided. The flow meter is arranged in an air intake passage of an engine to detect an actual flow rate of air flowing through the intake passage. The intake passage has a throttle valve with a variable opening size to control the actual flow rate of the air flowing in the intake passage. The throttle valve adjusts the actual flow rate of the air in proportion to an engine speed when the speed is greater than a predetermined magnitude. The throttle valve adjusts the actual flow rate regardless of the engine speed when the engine speed is smaller than the predetermined magnitude. The method includes the steps of detecting the engine speed, computing a target rate of the air flowing in the intake passage based on the detected engine speed, and a marginal range for allowing a deviation of the actual flow rate of the air flow with respect to the target rate, and determining the abnormality of the air flow meter when the engine speed is smaller than the predetermined magnitude and the actual rate of the air is out of the marginal range.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An apparatus and method for detecting abnormalities of an air flow meter according to a first embodiment of the present invention will hereafter be described with reference to the drawings.

Figure 1:
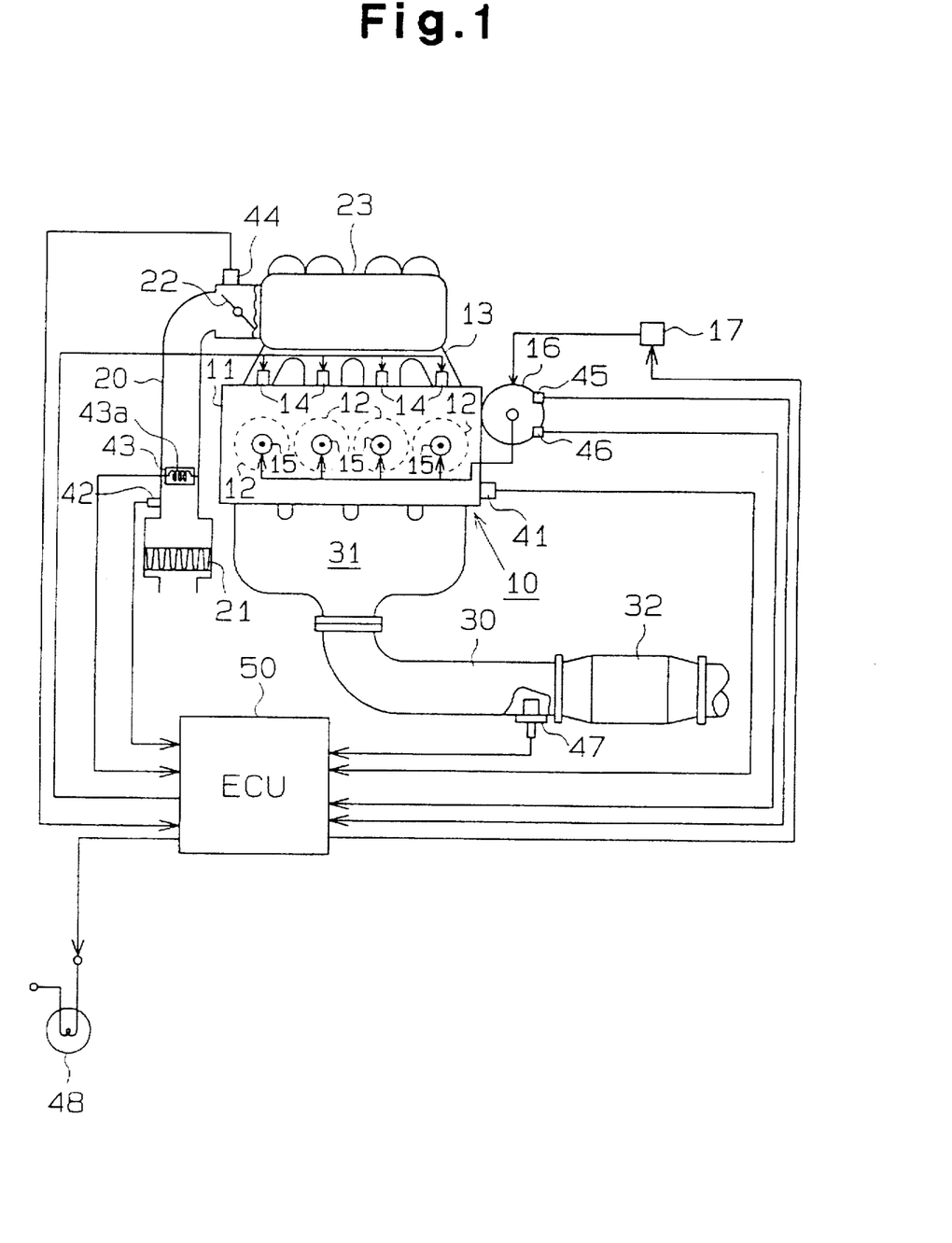
FIG. 1 is a schematic drawing showing a gasoline engine according to a first embodiment of the present invention.

FIG. 1 shows a gasoline engine system that employs an abnormality detecting apparatus of an air flow meter according to the first embodiment of the present invention. The system includes an engine 10, an intake passage 20, and an exhaust passage 30. Air is drawn into the engine 10 through the intake passage 20. The intake passage 20 includes a surge tank 23 and an intake manifold 13. Exhaust gas produced in the engine 10 is discharged therefrom through the exhaust passage 30. The exhaust passage 30 includes an exhaust manifold 31 and a catalytic converter 32.

The engine 10 has a cylinder block 11. A plurality of combustion chambers 12 are defined in the cylinder block 11. An intake manifold 13, to which each combustion chamber 12 is connected, is coupled to the cylinder block 11. A coolant temperature sensor 41 is provided in the cylinder block 11 to detect the temperature THW of the coolant flowing therethrough.

An air cleaner 21 is provided near the inlet of the intake passage 20. An intake air temperature sensor 42 is provided downstream of the air cleaner 21 in the intake passage 20. The temperature sensor 42 detects the temperature of the ambient air drawn into the intake passage 20, or the air intake temperature THA. A hot wire air flow meter 43 is provided downstream of the temperature sensor 42 to detect the air flow rate, or the volume of air flowing through the intake passage 20.

The air flow meter 43 is provided with a platinum wire 43a, which has a high temperature coefficient of resistance and which serves as a detecting portion. The wire 43a is exposed to the air flowing through the intake passage 20. The wire 43a is heated when electricity flows therethrough. The temperature of the wire 43a is altered by the flow rate and the velocity of the air drawn through the intake passage 20. To maintain the temperature of the wire 43a at a constant value, the electric current flow rate of the wire 43a is varied.

The flow rate of the current and its altering rate correspond to the air flow rate and its altering rate. The current flow rate of the wire 43a is adjusted to maintain the temperature of the wire 43a at a constant value. The electric current required for the adjustment is used to produce a proportional voltage VG from the air flow meter 43. An electronic control unit (ECU) 50 controls the engine 10 and detects abnormality of the air flow meter 43. The ECU 50 computes the actual air flow rate based on the voltage output VG of the air flow meter 43.

A throttle valve 22 is provided downstream of the air flow meter 43 in the intake passage 20. The throttle valve 22 is opened and closed in cooperation with the movement of an accelerator pedal (not shown). The cooperation of the throttle valve 22 and the accelerator pedal adjusts the amount of air drawn into the combustion chambers 12. A throttle sensor 44 is arranged near the throttle valve 22. The throttle sensor 44 detects the opening of the throttle valve 22, or the throttle opening TA.

The surge tank 23 suppresses pulsation of the air flowing through the intake passage 20. An injector 14 is provided for each combustion chamber 12 in the intake manifold 13. Each injector 14 injects fuel toward a port of the associated combustion chamber 12 when receiving an injection signal from the ECU 50. The fuel injected by each injector 14 is mixed with air and drawn into the combustion chamber 12.

A spark plug 15 is provided for each combustion chamber 12 in the engine 10. Each spark plug 15 ignites the air-fuel mixture in the associated combustion chamber 12. The spark plugs 15 are connected to a distributor 16 by plug cords (not shown). An ignitor 17 is connected to the distributor 16. The ignitor 17 generates high voltage when receiving an ignition signal from the ECU 50. The high voltage output from the ignitor 17 is distributed to each spark plug 15 by the distributor 16 in accordance with the alteration of the crankshaft angle.

A rotor (not shown) that rotates in cooperation with the engine 10 is incorporated in the distributor 16. An engine speed sensor 45 is arranged in the distributor 16 to detect the engine speed NE based on the rotation of the rotor. A pulse signal is output from the speed sensor 45 each time the crankshaft angle is altered, for example, by ten degrees.

A cylinder distinguishing sensor 46 is provided in the distributor 16. The sensor 46 detects the alteration of the crankshaft angle in the engine 10 in accordance with the rotation of the rotor at a predetermined rate. A reference position signal is output from the sensor 46 each time the crankshaft angle is altered by 720 degrees.

The exhaust manifold 31 is coupled to the cylinder block 11. The catalytic converter 32 provided in the exhaust passage 30 incorporates a three-way catalyst. An oxygen sensor 47 is arranged in the upstream vicinity of the catalytic converter 32. The oxygen sensor 47 detects the concentration of the oxygen contained in the exhaust gas. The oxygen concentration detected by the oxygen sensor 47 is referred to when feedback controlling the air-fuel ratio in the engine 10.

A warning lamp 48, which warns the driver of abnormalities related with the air flow meter 43, is arranged on an instrument panel (not shown) provided in front of the driver's seat.

Figure 2:
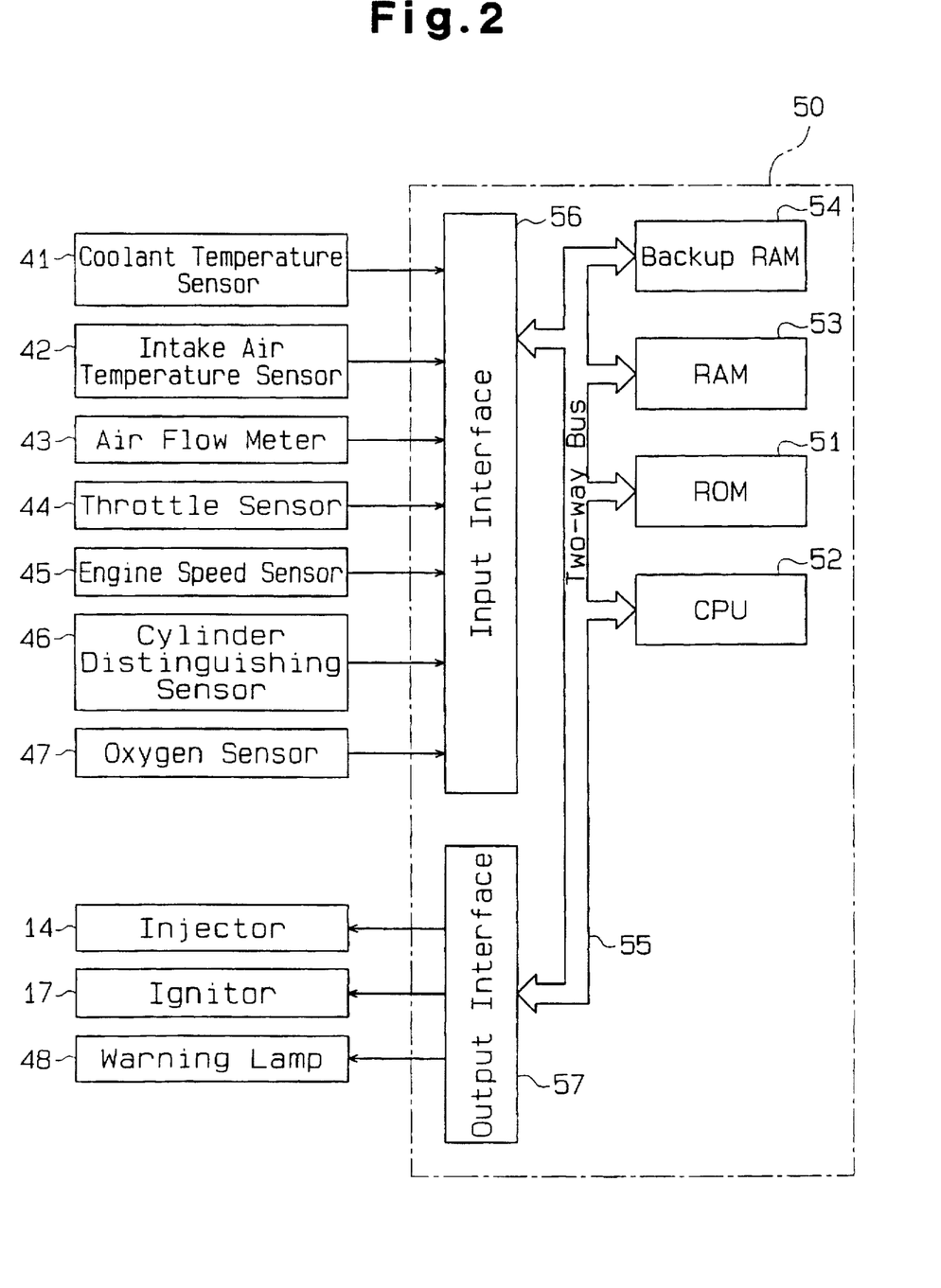
FIG. 2 is a block circuit diagram of an electronic control unit.

As shown in the block circuit diagram of FIG. 2, the ECU 50 includes a central processing unit (CPU) 52, a read-only memory (ROM) 51, a random access memory (RAM) 53, and a backup RAM 54. The ECU 50 is constituted by a circuit in which the ROM 51, CPU 52, RAM 53, and backup RAM 54 are connected to an input interface 56 and an output interface 57 by a two-way bus 55. Things such as an abnormality detection processing program, functional data, and control programs are stored in the ROM 51. The abnormality detection processing program is applied to detect abnormalities of the air flow meter 43. The functional data is used to compute a target intake air flow rate from the throttle opening TA. The control programs include programs that are executed to control fuel injection such as air-fuel ratio feedback control. The CPU 52 executes steps based on the control programs stored in the ROM 51. The RAM 53 temporarily stores the data computed by the CPU 52 and the data sent from various sensors. The backup RAM 64 stores data that require storing when the engine 10 is stopped.

The coolant temperature sensor 41, the intake air temperature sensor 42, the air flow meter 43, the throttle sensor 44, the engine speed sensor 45, the cylinder distinguishing sensor 46, and the oxygen sensor 47 are connected to the input interface 56. Analog signals sent to the input interface 56 from the sensors 41–47 are converted into digital signals by an analog to digital (A/D) converter (not shown).

External circuits, which include the injectors 14, the ignitor 17, and the warning lamp 48, are connected to the output interface 57. The external circuits are controlled by the CPU 52 based on data computed through the control programs.

Fuel injection control is performed by computing the amount of fuel injection based on the values detected by the sensors 41–47 and in correspondence with the running state of the engine 10. Fuel is injected in accordance with the computed results. The fuel injection control is executed by the CPU 52.

The contents of the abnormality detection processing program executed by the CPU 52 will now be described with reference to FIGS. 3–6.

Figure 3:
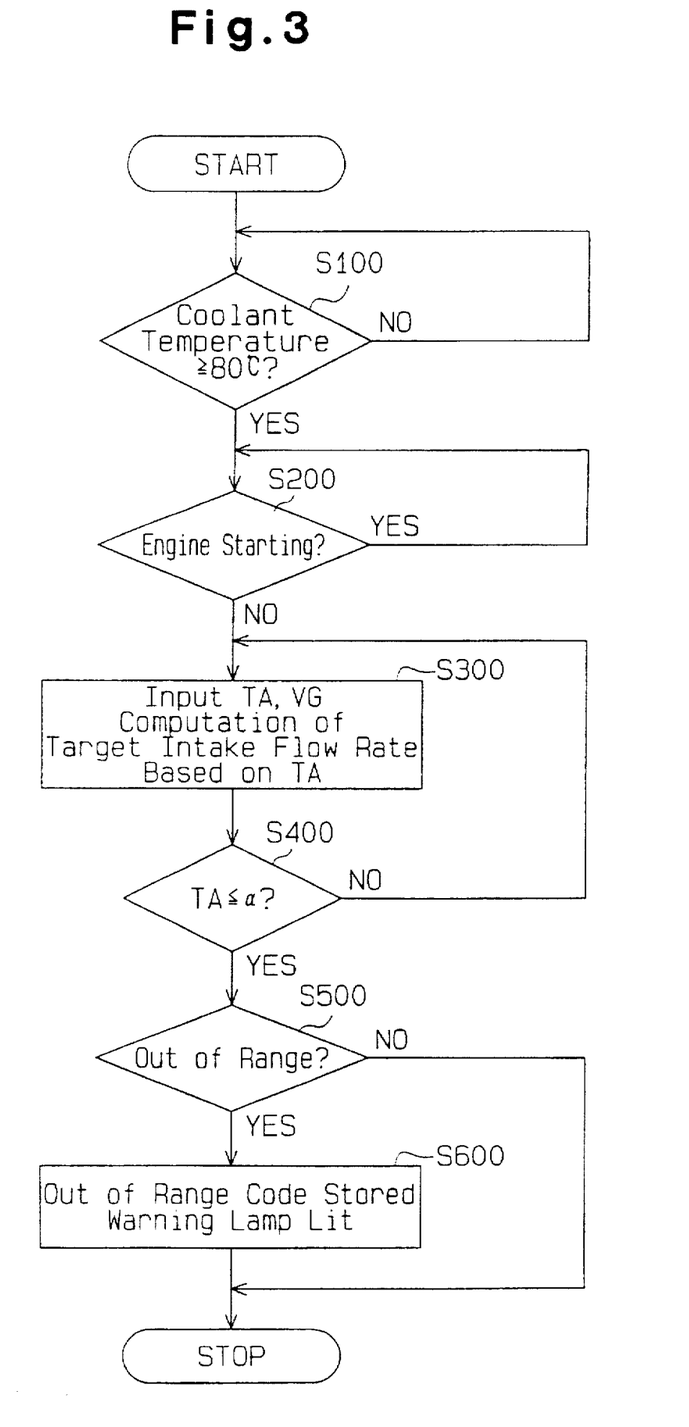
FIG. 3 is a flowchart showing the contents of a processing program used to detect abnormalities.

A main routine of the abnormality detection program is illustrated in the flowchart of FIG. 3. In step 100, the CPU 52 judges whether the coolant temperature THW detected by the coolant sensor 41 is 80 degrees Celsius or higher. If the coolant temperature THW is lower than 80 degrees Celsius, the engine 10 is in a cool state and not yet warmed up. Erroneous detection may occur if the abnormality detection of the air flow meter 43 is carried out when the engine 10 is cool. Thus, detection is prohibited when the engine 10 is in a cool state. Accordingly, the CPU 52 waits until the coolant temperature THW becomes 80 degrees Celsius or higher before proceeding to the subsequent step. If the coolant temperature THW is equal to or higher than 80 degrees Celsius, the CPU 52 proceeds to step 200.

At step 200, the CPU 52 judges whether the engine 10 is being started based on the signals sent from the engine speed sensor 45. Starting control is carried out when the engine 10 is started. The starting control is executed only when the engine 10 is being started and not when the engine 10 is running. Erroneous detection may take place if the abnormality detection of the air flow meter 43 is carried out during execution of the starting control. Thus, detection is prohibited when the engine 10 is being started. Accordingly, the CPU 52 waits until the starting control is completed before proceeding to the subsequent step. When the engine 10 is not being started, the CPU 52 proceeds to step 300.

At step 300, the throttle opening TA detected by the throttle sensor 44 and the output voltage VG of the air flow meter 43 are input in the CPU 52. The CPU 52 then computes the target intake air flow rate from the value of the throttle opening TA with reference to the functional data stored in the ROM 52.

At step 400, the CPU 52 judges whether the input value of the throttle opening TA is equal to or lower than a reference value α. If the value of the throttle opening TA is greater than the reference value α, the CPU 52 returns to step 300. If the throttle opening TA is equal to or lower than the reference value α, the CPU 52 proceeds to step 500.

Figure 4:
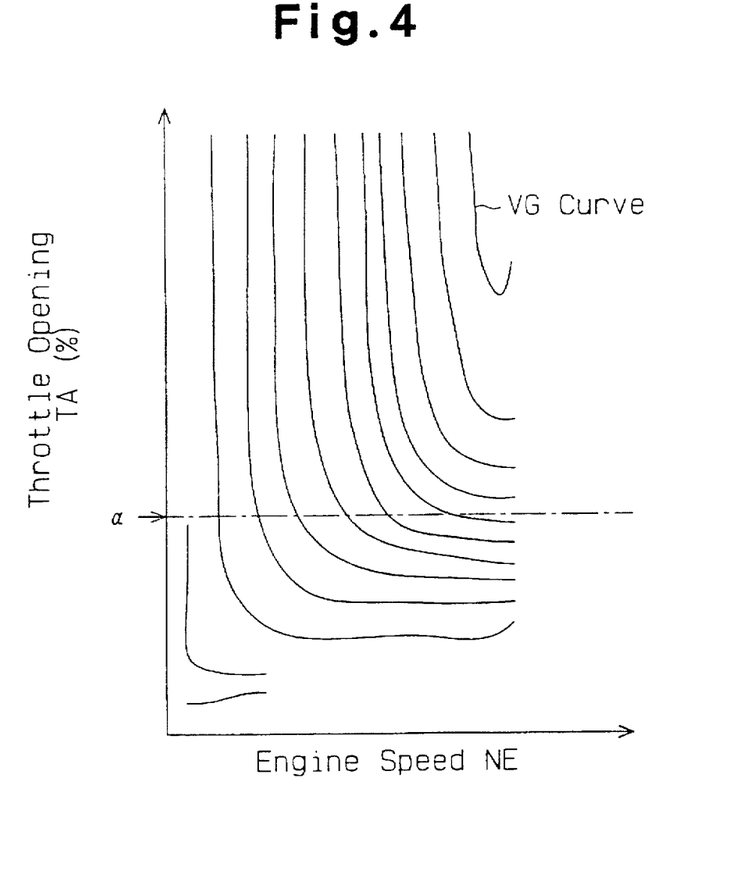
FIG. 4 is a graph showing the relationship between the throttle opening, the engine speed, and the air flow meter output voltage.
Figure 5:
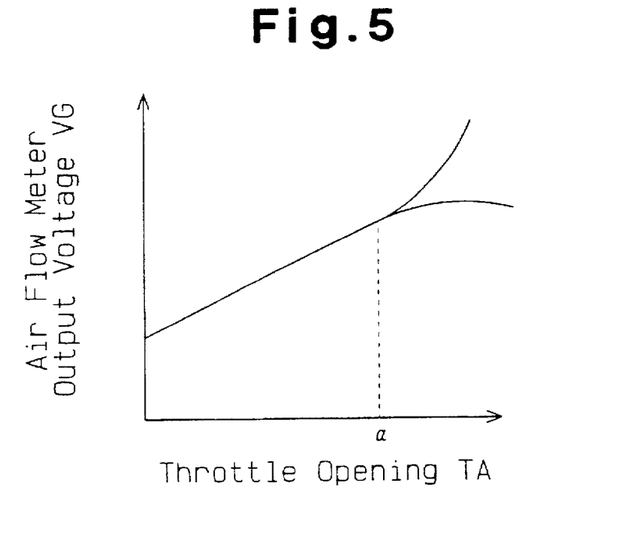
FIG. 5 is a graph showing the relationship between the throttle opening and the air flow meter output voltage.

The reasons for using the reference value α to judge the degree of the throttle opening TA will now be described. The graph of FIG. 4 illustrates three-dimensional, functional data (three-dimensional map), the parameters of which are the engine speed NE, the throttle opening TA, and the output voltage VG. In this graph, the vertical axis indicates the throttle opening TA (%) while the lateral axis indicates the engine speed NE(rpm). Each curve represents the output voltage VG of the air flow meter 43. The graph of FIG. 5 shows the relationship between the throttle opening TA and the output voltage VG with respect to an arbitrary value of the engine speed NE in the three-dimensional map of FIG. 4. The vertical axis indicates the output voltage VG while the lateral axis indicates the throttle opening TA (%).

As shown in FIG. 4, the reference value α is set at a relatively low value of the throttle opening TA. In the range under the reference value α, the output voltage VG is mainly affected by the throttle opening TA. The influence of the engine speed NE is rather small within this range. When the value of the throttle opening TA is small, a wide area of the intake passage 20 is closed. Thus, the volume of air that flows into each combustion chamber 12 is constant even when high engine speeds NE increase the velocity of the air drawn into the combustion chambers 12. This causes the output voltage VG of the air flow meter 43 to be greatly dependent on the throttle opening TA. In other words, the flow rate of the air passing through the throttle valve 22 is a determining factor that influences the velocity of the air flowing through the entire intake passage 20.

Contrarily, a wide area of the intake passage 20 is opened when the value of the throttle opening TA is large. This causes the velocity of the air flowing through the intake passage 20 to be dependent on the engine speed NE. Accordingly, the air flow rate detected by the air flow meter 43 is varied when the engine speed NE is altered.

As shown in FIG. 5, the output voltage VG of the air flow meter 43 is proportional to the throttle opening TA when the throttle opening TA is relatively small. Accordingly, when the throttle opening TA is relatively small, detection of abnormalities of the air flow meter 43 may be carried out by using only the parameter of the throttle opening TA.

By using the throttle opening TA in addition to the parameter of the output voltage, abnormalities of the air flow meter 43 including those that cause inaccurate readings may be detected easily. The value of the throttle opening TA becomes small for at least the time when the engine 10 is started. This enables confirmation of abnormalities each time the engine 10 is started.

Returning to the flowchart of FIG. 3, if the throttle opening TA is equal to or lower than the reference value α in step 400, the CPU 52 proceeds to step 500. At step 500, the CPU 52 judges whether the output voltage VG is out of a predetermined normal range. To perform the judgement, the CPU 52 computes the absolute value of the difference between the target intake air flow rate computed in FIG. 300 and the actually detected output voltage VG. The CPU 52 judges whether the absolute value is equal to or lower than a predetermined value to judge whether the output voltage VG is out of the normal range.

Figure 6:
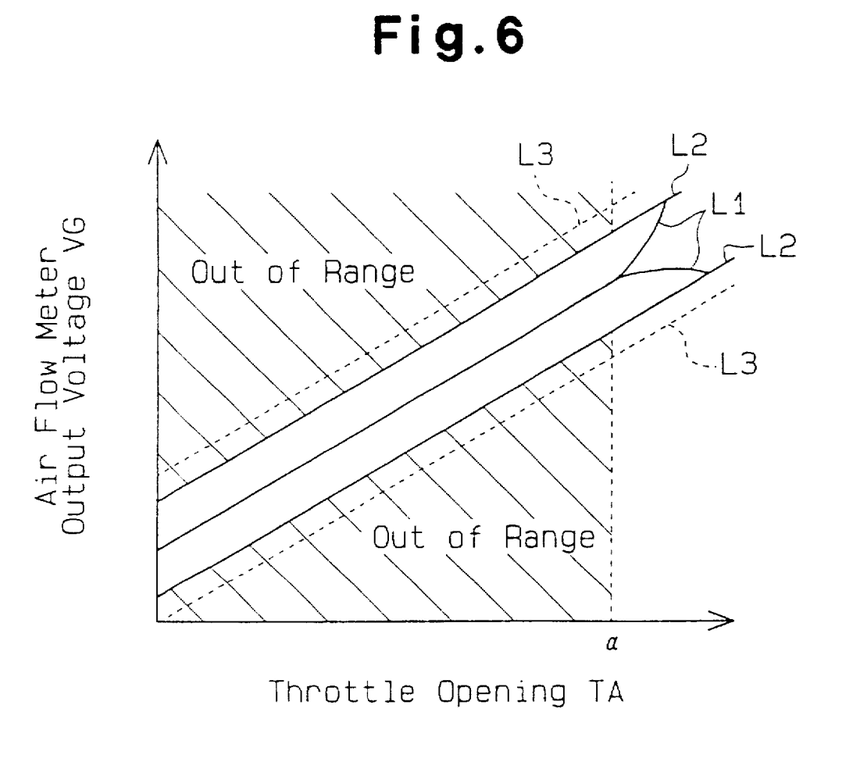
FIG. 6 is a graph showing the range of the air flow meter that may be detected by the abnormality detecting apparatus.

The functional data used during the judgement is shown in the graph of FIG. 6. The conditions that are to be satisfied for detection of abnormalities are shown in the graph. The vertical axis indicates the output voltage VG of the air flow meter 43 while the lateral axis shows the throttle opening TA. Line L1 is obtained by plotting the target intake air flow rate computed in step 300. The optimum relationship between the throttle opening TA and the output voltage VG is indicated by line L1. The two upper and lower bounding lines L2 define the range in which the air flow rate detected by the air flow meter 43 is in a normal state. Accordingly, when the output voltage VG of the air flow meter 43 is in the range defined between the upper and lower bounding lines L2, the meter 43 is functioning normally. The absolute value of the difference between the line L1 and each bounding line L2 corresponds to the predetermined value used in step 500. In the graph, the areas marked by slanted lines indicate a range of detection by the air flow meter 43 that is out of the normal range.

The upper and lower broken lines L3 in the graph of FIG. 6 indicate threshold values at which the stalling of the engine 10 begins. The abnormality detecting apparatus according to the present invention detects abnormalities before the engine 10 stalls. Accordingly, in addition to abnormalities that prevent detection with the air flow meter 43, abnormalities that cause inaccurate reading of the meter 43 may also be detected.

In step 500, when the output voltage VG of the air flow meter 43 and the corresponding throttle opening TA is out of the normal range, the CPU 52 proceeds to step 600. At step 600, the CPU 52 stores an out of range code in the backup RAM 54 and lights the warning lamp 48 provided on the instrumental panel. The CPU 52 then returns the processing to the main routine (not shown). If the output voltage VG of the air flow meter 43 and the corresponding throttle opening TA is within the predetermined range, the CPU 52 directly returns to the main routine.

As described above, in the abnormality detecting apparatus of this embodiment, the throttle opening TA is detected as the only parameter related with the output voltage VG of the air flow meter 43. In addition, the output voltage VG of the air flow meter 43 is detected when the throttle opening TA is within a range in which the influences of alteration in the engine speed NE is small. The detected output voltage VG is used to detect abnormalities of the air flow meter 43.

Accordingly, abnormalities of the air flow meter 43 are detected by processing a single parameter (throttle opening TA) that corresponds to the output voltage VG, whereas in the prior art, a plurality of parameters corresponding to the output voltage VG were processed to detect abnormalities. This simplifies the controlling performed by the CPU 52.

In addition to the output voltage VG, it is required that only a single parameter (throttle opening TA) be stored when processing data to detect abnormalities. This reduces the required memory capacity of the RAM 53 in the CPU 52. Furthermore, the value of the throttle opening TA becomes low at least once after the engine 10 is started. This enables the abnormality detection of the air flow meter 43 to be performed each time the engine 10 is started.

The prerequisite for detecting abnormalities is that the output voltage VG and the throttle opening TA be proportional to each other, as shown in FIG. 5. As shown in FIG. 6, the area between the upper and lower threshold values (indicated by the bounding lines L2 in FIG. 6), which is used to judge abnormalities of the air flow meter 43, may be narrowed.

Accordingly, abnormalities that cause inaccurate reading, such as those caused by deterioration of the air flow meter 43, may be detected before the engine 10 stalls. This enables abnormalities that cause inaccurate reading to be detected at an early stage. This allows the concentration of NOx, CO, and other components in the exhaust gas to be maintained at an appropriate value and improves emissions.

An apparatus and method for detecting abnormalities of an air flow meter according to a second embodiment of the present invention will hereafter be described with reference to the drawings. Parts that are identical to those employed in the first embodiment are denoted with the same numerals. Mainly, parts differing from the first embodiment will be described.

Figure 7:
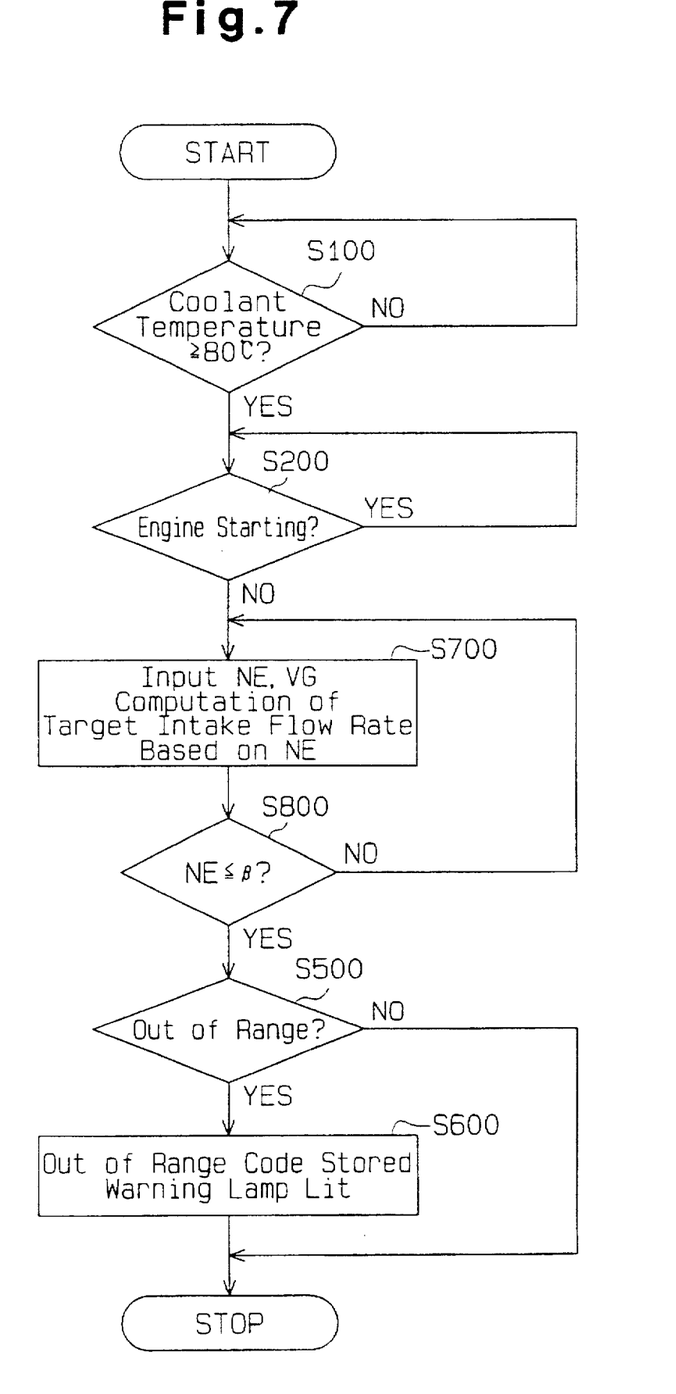
FIG. 7 is a flowchart showing the contents of a processing program used to detect abnormalities in a second embodiment according to the present invention.

In this embodiment, the contents of the abnormality detection processing program differs from the first embodiment. A main routine of the abnormality detection program is illustrated in the flowchart of FIG. 7. Steps 300 and 400 of the first embodiment described in the flowchart of FIG. 3 are replaced by steps 700 and 800 in this embodiment. The other steps 100, 200, 500, 600 are identical in both first and second embodiments.

At step 300 of the program of the first embodiment, which is illustrated in FIG. 3, the values of the throttle opening TA and the output voltage VG are sent to the CPU The CPU 52 refers to the functional data stored in the ROM 51 to compute the target intake air flow rate from the value of the throttle opening TA. In comparison, at step 700 of this embodiment, which is illustrated in FIG. 7, the values of the engine speed NE detected by the engine speed sensor 45 and the output voltage VG are sent to the CPU 52. The CPU 52 refers to the functional data stored in the ROM 51 to compute the target intake air flow rate from the value of the engine speed NE.

At step 400 of the first embodiment, which is illustrated in FIG. 3, the CPU 52 judges whether the input value of the throttle opening TA is equal to or lower than the reference value α. If the throttle opening TA is greater than the reference value α, the CPU 52 returns to step 300. If the throttle opening TA is equal to or lower than the reference value α, the CPU 52 proceeds to step 500. In comparison, at step 800 of this embodiment, which is illustrated in FIG. 7, the CPU 52 judges whether the input value of the engine speed NE is equal to or lower than a reference value β. If the engine speed NE is greater than the reference value β, the CPU 52 returns to step 300. If the engine speed NE is equal to or lower than the reference value β, the CPU 52 proceeds to step 500.

In the first embodiment, the throttle opening TA is used as the single parameter corresponding to the output voltage VG of the air flow meter 43. However, as shown in the graph of FIG. 4, the engine speed NE may be used as the single parameter corresponding to the output voltage VG when the value of the speed NE is large. That is, when the engine speed NE is high, the intake air flow rate is dependent only on the engine speed NE since the value of the throttle opening TA is large. Accordingly, the detection of abnormalities of the air flow meter 43 may be performed by using the set of parameters consisting of the output voltage VG and the engine speed NE in addition to the set of parameters consisting of the output voltage VG and the throttle opening TA.

This embodiment accomplishes the same advantageous effects of the first embodiment.

Although only two embodiments of the present invention have been described herein, it should be apparent to those skilled in the art that the present invention may be embodied in many other specific forms without departing from the spirit or scope of the invention. In particular, the present invention may be modified as described below.

In the first embodiment, an abnormality of the air flow meter 43 is detected when the throttle opening TA becomes equal to lower than the reference value α and when the output voltage VG of the air flow meter 43 is not in the predetermined normal range. Erroneous detection of abnormalities of the air flow meter 43 may be prevented by further detecting the output voltage VG when the throttle opening TA is zero percent (the state in which the throttle valve 22 is completely closed). In this case, the abnormality of the air flow meter is confirmed when the detected output voltage VG remains out of the normal range.

In the first embodiment, erroneous detection of abnormalities of the air flow meter 43 may also be prevented by confirming abnormalities when the throttle opening TA is equal to or lower than the reference value α and the output voltage VG remains out of the predetermined range for over a predetermined time period.

Therefore, the present examples and embodiments are to be considered as illustrative and not restrictive and the invention is not to be limited to the details given herein, but may be modified within the scope of the appended claims.

What is claimed is:

1. An apparatus for detecting an abnormality in an air flow meter comprising:

an engine having an air intake passage;

an air flow meter disposed in said air intake passage to detect an actual flow rate of air flowing through said intake passage;

a throttle valve disposed in said intake passage to control the actual flow rate of the air flowing in said intake passage;

said throttle devised to vary an opening between a maximum size and a minimum size, wherein said throttle valve adjusts the actual flow rate of the air when the opening size is defined by a first range that covers at least an intermediate opening size, and wherein the throttle valve adjusts the actual flow rate regardless of the engine speed when the opening size is defined by a second range that covers the vicinity of the minimum opening size;

detecting means for detecting the opening size of said throttle valve;

computing means for computing a target rate of the air flowing in said intake passage based on the detected opening size of said throttle valve, said computing means designed to compute a marginal range for allowing a deviation of the actual flow rate of the air with respect to the target rate; and determining means for determining the abnormality of the air flow meter when the opening size of the throttle valve is in the second range and the actual flow rate of the air is out of the marginal range.

2. The apparatus as set forth in claim 1, wherein said computing means and said determining means are defined by an electronic control unit.

3. The apparatus as set forth in claim 1, wherein said throttle is opened to an additional range which is greater than the first range, wherein said additional range covers the maximum opening size.

4. The apparatus as set forth in claim 1 further comprising a conductive wire provided with the air flow meter, said wire being arranged to keep a temperature thereof constant, said wire being cooled by the actual flow rate of the air flowing in the intake passage and heated by electricity flowing therethrough, wherein electric voltage applied to the wire is changed according to the actual flow rate of the air.

5. The apparatus as set forth in claim 4, wherein the electric voltage applied to the wire is substantially constant regardless of the engine speed when the opening size of the throttle valve is in the second range.

6. The apparatus as set forth in claim 5, wherein said warning means includes a warning lamp.

7. The apparatus as set forth in claim 5 further comprising warning means for warning an operator of the abnormality of the air flow meter.

8. The apparatus as set forth in claim 7 further including sensing means for sensing the engine being warmed up and actuated prior to the computation of the target flow rate of the air.

9. The apparatus as set forth in claim 8, wherein said sensing means includes:

a first sensor for sensing a coolant temperature; and a second sensor for sensing the engine speed.

10. The apparatus as set forth in claim 9, wherein said marginal range includes an upper sub-range and a lower sub-range with respect to the target flow rate of the air.

11. An apparatus for detecting an abnormality of an air flow meter disposed in an air intake passage of an engine to detect an actual flow rate of air flowing through the intake passage, said intake passage having a throttle valve with a variable opening size to control the actual flow rate of the air flowing in the intake passage, wherein the throttle valve adjusts the actual flow rate of the air in proportion to an engine speed when the speed is greater than a predetermined magnitude, and wherein the throttle valve adjusts the actual flow rate regardless of the engine speed when the engine speed is smaller than the predetermined magnitude, said apparatus comprising;

detecting means for detecting the engine speed;

computing means for computing a target rate of the air flow in said intake passage based on the detected engine speed, said computing means being arranged to compute a marginal range for allowing a deviation of the actual flow rate of the air with respect to the target rate; and determining means for determining the abnormality of the air flow meter when the engine speed is smaller than the predetermined magnitude and the actual rate of the air is out of the marginal range.

12. The apparatus as set forth in claim 11 further comprising a conductive wire provided with the air flow meter, said wire being arranged to keep a temperature thereof constant, said wire being cooled by the air flowing in the intake passage and heated by electricity flowing therethrough, wherein electric voltage applied to the wire is changed according to the actual flow rate of the air.

13. The apparatus as set forth in claim 12, wherein the electric voltage applied to the wire is substantially constant regardless of the engine speed when the engine speed is smaller than the predetermined magnitude.

14. The apparatus as set forth in claim 13 further comprising warning means for warning an operator of the abnormality of the air flow meter.

15. The apparatus as set forth in claim 14, wherein said warning means includes a warning lamp.

16. The apparatus as set forth in claim 11, wherein said computing means and said determining means are defined by an electronic control unit.

17. A method for detecting an abnormality of an air flow meter disposed in an air intake passage of an engine to detect an actual flow rate of air flowing through the intake passage, said intake passage having a throttle valve with a variable opening size to control the actual flow rate of the air flowing in the intake passage, wherein the throttle valve adjusts the actual flow rate of the air according to an engine speed when the opening size is in a first range, and wherein the throttle valve adjusts the actual flow rate regardless of the engine speed when the opening size is in a second range, said method comprising steps of;

detecting the opening size of said throttle valve;

computing a target rate of the air flow in said intake passage based on the detected opening size of the throttle valve, and a marginal range for allowing a deviation of the actual flow rate of the air flow with respect to the target rate; and determining the abnormality of the air flow meter when the opening size of the throttle valve is in the second range and the actual flow rate of the air is out of the marginal range.

18. The method as set forth in claim 17 further comprising a step of warning an operator of the abnormality of the air flow meter.

19. The method as set forth in claim 18 further including a step of sensing the engine being warmed up and actuated prior to the computing step.

20. The method as set forth in claim 19, wherein said sensing step includes:

a first step for sensing a coolant temperature; and a second step for sensing the engine speed.

21. A method for detecting an abnormality of an air flow meter disposed in an air intake passage of an engine to detect an actual flow rate of air flowing through the intake passage, said intake passage having a throttle valve with a variable opening size to control the actual flow rate of the air flowing in the intake passage, wherein the throttle valve adjusts the actual flow rate of the air in proportion to an engine speed when the speed is greater than a predetermined magnitude, and wherein the throttle valve adjusts the actual flow rate regardless of the engine speed when the engine speed is smaller than the predetermined magnitude, said method comprising steps of;

detecting the engine speed;

computing a target rate of the air flowing in said intake passage based on the detected engine speed, and a marginal range for allowing a deviation of the actual flow rate of the air flow with respect to the target rate; and determining the abnormality of the air flow meter when the engine speed is smaller than the predetermined magnitude and the actual rate of the air is out of the marginal range.

22. The method as set forth in claim 21 further comprising a step of warning an operator of the abnormality of the air flow meter.

23. The method as set forth in claim 22 further including a step of sensing the engine being warmed up and actuated prior to the computing step.

24. An apparatus for detecting an abnormality of an air flow meter disposed in an air intake passage of an engine to detect an actual flow rate of air flowing through the intake passage, said apparatus comprising:

a throttle valve disposed in the intake passage to control the actual flow rate of the air flowing in the intake passage with a variable opening size between a maximum opening size and a minimum opening size, wherein the throttle valve adjusts the actual flow rate of the air when the opening size is in a first range that covers at least an intermediate opening size, and wherein the throttle valve adjusts the actual flow rate regardless of the opening size of the throttle valve, when the opening size of the throttle valve is in a second range that covers the vicinity of the maximum opening size;

detecting means for detecting the opening size of said throttle valve;

computing means for computing a target rate of the air flowing in said intake passage based on the detected opening size of the throttle valve, said computing means being arranged to compute a marginal range for allowing a deviation of the actual flow rate of the air with respect to the target rate; and determining means for determining the abnormality of the air flow meter when the opening size of the throttle valve is in the second range and the actual flow rate of the air is out of the marginal range.

25. The apparatus as set forth in claim 24, wherein said throttle valve is opened to an additional range that is less that the first range, wherein said additional range covers the minimum opening size.

* * * * *

UNITED STATES PATENT AND TRADEMARK OFFICE
CERTIFICATE OF CORRECTION

PATENT NO. : 5,741,964
DATED : 21 April 1998
INVENTOR(S) : Koichi MIZUTANI

It is certified that error appears in the above-identified patent and that said Letters Patent is hereby corrected as shown below:

| Column | Line | |
|--------|------|---|
| 1 | 58 | Change "inaccurate" to --accurate--. |
| 6 | 22 | Change "RAM 64" to --RAM 54--. |
| 8 | 34 | Change "prevent" to --elude--. |
| 8 | 54 | Change "NE is small" to --NE are small--. |
| 9 | 35 | Change "CPU The " to --CPU 52. The--. |
| 10 | 30 | Before "over" delete "for". |
| 10 | 7 | Change "effects of" to --effects as--. |

Signed and Sealed this

Eleventh Day of May, 1999

Attest:

Q. TODD DICKINSON

*Attesting Officer*    Acting Commissioner of Patents and Trademarks